United States Patent Office 2,783,989
Patented Mar. 5, 1957

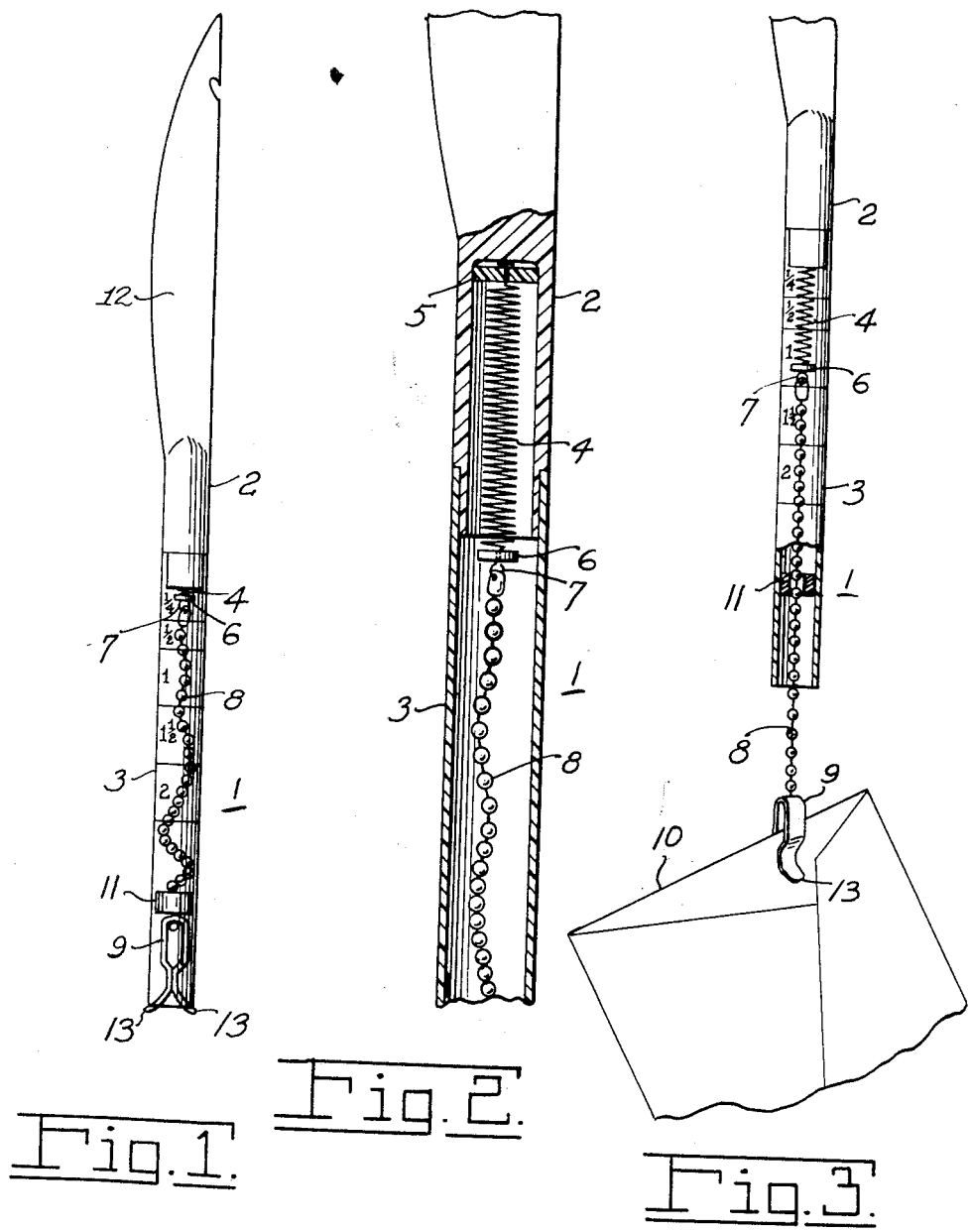

2,783,989

WEIGH SCALE FOR MAIL PARCELS SUCH AS LETTERS AND THE LIKE

Joseph B. Biederman, Cincinnati, Ohio

Application July 13, 1953, Serial No. 367,550

1 Claim. (Cl. 265—63)

This invention relates to a scale for weighing light objects such as letters and the like, where the weight thereof is of the order of two ounces or less.

An object of this invention is to provide a small, unique device for weighing letters and the like, where the maximum weight usually does not exceed two ounces.

Another object of the invention is to provide a weighing device that embodies a transparent barrel and a hollow member attached to one end of the barrel, and a spring within the hollow member and suspended by one end thereof from said hollow member. The free end of the spring extends to the adjacent end of the transparent barrel, the spring being provided with means at its free end which extends beyond the barrel for attaching a letter or the like thereto.

Another object of the invention is to provide a weigh scale, as set forth in the preceding object, in which the transparent barrel and the free end of the spring are provided with co-registering means to indicate the weight of a letter or the like, attached to or suspended from the spring.

A still further object of the invention is to provide a weigh scale of the type set forth above, that is provided with means for substantially completely unloading the spring when not in use.

The above and other objects of the invention will be apparent to those of ordinary skill in the art to which the invention pertains, from the following description taken in conjunction with the accompanying drawing.

In the drawing:

Figure 1 is a view in side elevation of a weigh scale arranged and constructed in accordance with an embodiment of the invention;

Fig. 2 is a partial enlarged view in longitudinal section of the weigh scale shown in Fig. 1; and Fig. 3 is a view similar to Fig. 1, showing a letter or the like being weighed by the scale.

The weigh scale 1, as illustrated, comprises a hollow member 2, having secured to the lower or open end thereof a transparent barrel 3, which is provided with graduations in ounces, as indicated. Within the hollow member 2 is a spring 4, which, according to Hooke's law, will elongate in direct proportion to the weight suspended from it. The upper end of the spring is secured to a disk 5, which is rigidly secured to the upper end of the hollow of member 2. The lower end of spring 4 extends to approximately the lower end of hollow member 2, and is provided at that end with a disk 6. The lower end of the spring 3 extends through disk 6, and terminates in a hook 7, from which is suspended a link, such as a ball chain 8. The length of the chain is such that its lower end projects beyond the end of the transparent barrel 3 when a letter or the like is to be weighed by the scale.

The lower end of the ball chain 8 is provided with a clip 9 which is resilient and spring-like, that will hold a letter when placed between the jaws thereof, as shown in Fig. 3. When a letter, such as indicated at 10, is attached to the clip 9, spring 4 elongates, as shown in Fig. 3. By observing the location of disk 6 with respect to the graduated scale on the transparent barrel 3, one can determine how much postage the letter requires.

I am reliably informed that approximately 99% of first class mail handled by the United States Post Office weighs less than two ounces. Therefore, a weigh scale such as illustrated herein is adequate for most purposes, convenient, easy to use, and may be kept on one's office desk much the same as a fountain pen would be.

In order to protect the weigh spring 4 against overloading, an annular stop 11 is placed inside the transparent barrel 3 and secured thereto. Thus, if a letter or piece of first class mail suspended from clip 9 exceeds the maximum load of the scale, disk 6 will come to rest on the stop 11 and thereby prevent overstretching of the weigh spring 4.

The weigh scale may be provided at the upper end of the hollow member 2 with various forms of devices. For instance, as illustrated, the upper end of the hollow member 2 is provided with a letter opener blade 12. That blade and the hollow member 2 may be made as an integral piece from any suitable type of moldable plastic. Likewise, the hollow, transparent barrel 3 may be made of plastic, if desired.

As shown in Fig. 1, clip 9 is so constructed that, when it is pushed up into the open end of barrel 3, the clip grips the inside edge of the barrel and holds the clip within the same, as shown. When so placed in the barrel, the chain 8 is entirely within the barrel so that there is little likelihood that anything would catch on the clip and accidentally overstretch the spring and thereby damage the scale. As indicated in Fig. 1, the upper end of the clip 9 abuts the stop 11 when substantially the entire clip is within the barrel with ends 13 of the clip projecting below the barrel to form a finger grip for removing the clip from the barrel.

Having thus described the invention, it will be apparent to those skilled in this art, that various modifications and changes may be made in the illustrated embodiment thereof, without departing from either the spirit or the scope of the invention.

Therefore, what I claim as new and desire to secure by Letters Patent is:

A postage weigh scale comprising a hollow member having an open end, a hollow transparent barrel attached to the open end of said hollow member, a coil spring in said hollow member and suspended by one end from the upper end of the hollow of said hollow member, a flexible link suspended from the lower end of said spring, an elongated resiliently expandable clip attached to said link and projecting normally beyond the lower open end of the transparent barrel for attaching a letter or the like to the link, said transparent barrel having weight calibrations thereon, and means on the spring registering with said calibrations to indicate the weight of said letter or the like, the clip having converging gripping portions terminating in diverging resilient arms frictionally engageable with the inside of the barrel to hold the clip inside the barrel when storing the flexible link in the barrel.

References Cited in the file of this patent

UNITED STATES PATENTS

| 33,091 | Lawrence | Aug. 20, 1861 |
| 209,180 | Miles | Oct. 22, 1878 |
| 2,009,363 | Scheurer | July 23, 1935 |
| 2,072,037 | Kaplan | Feb. 23, 1937 |
| 2,553,479 | Schmarje et al. | May 15, 1951 |
| 2,690,927 | Bean | Oct. 5, 1954 |

FOREIGN PATENTS

| 51,108 | Austria | Dec. 11, 1911 |
| 365,837 | Germany | Dec. 22, 1922 |
| 585,632 | Germany | Aug. 20, 1934 |